K. A. BOWER.
TIRE HOLDER.
APPLICATION FILED APR. 21, 1916.
1,231,480.
Patented June 26, 1917.
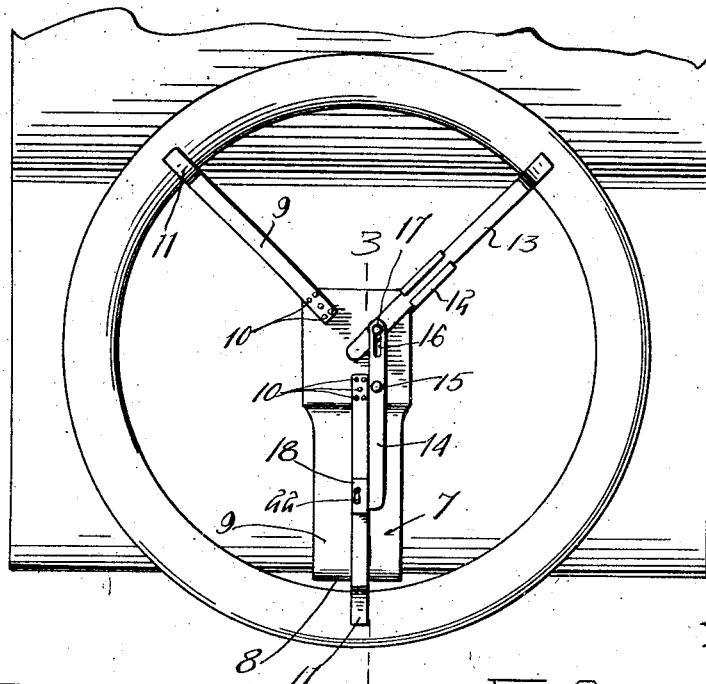
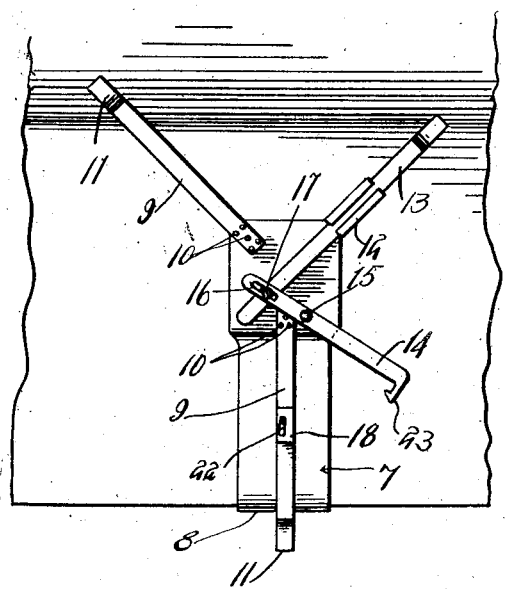
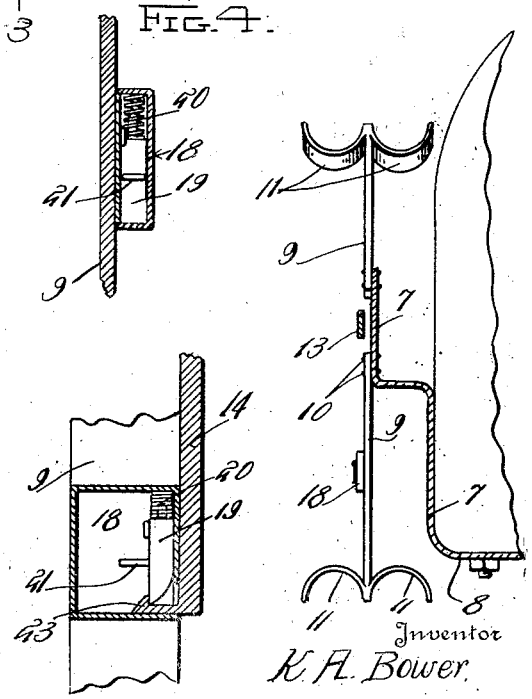
Inventor
K. A. Bower.

UNITED STATES PATENT OFFICE.

KEITH A. BOWER, OF SHELBURNE, NOVA SCOTIA, CANADA.

TIRE-HOLDER.

1,231,480.    Specification of Letters Patent.    Patented June 26, 1917.

Application filed April 21, 1916. Serial No. 92,784.

*To all whom it may concern:*

Be it known that I, KEITH A. BOWER, a subject of the King of Great Britain, residing at Shelburne, in the Province of Nova Scotia, Dominion of Canada, have invented certain new and useful Improvements in Tire-Holders; and I do hereby declare the following to be a full, clear, and exact description of the invention, such as will enable others skilled in the art to which it appertains to make and use the same.

This invention relates to tire holders, and particularly to means for supporting the auxiliary or supplemental tires upon the rear or side of a motor vehicle.

The primary object of the invention is to provide a holder of this character by the use of which the tire or tires may be firmly supported against accidental or unauthorized detachment but which may be readily removed from the supporter holder when desired.

A further object of the invention is to provide a holder of this type which is further characterized by improved means for locking the tire upon the support.

A still further object of the invention is to provide a device of this character which is of simple and inexpensive construction, which is so arranged as to be capable of application to various types of vehicles, and which will prove thoroughly efficient in the attainment of the ends for which it is designed.

With these objects in view, together with others which will appear as the description proceeds, the invention resides in the novel combination and arrangement of parts, all as will be described more fully hereinafter, illustrated in the drawings and particularly pointed out in the claims.

The invention will be best understood by reference to the accompanying drawing, wherein:

Figure 1 is a rear elevation of a conventional form of motor vehicle and illustrating the application of a tire holder embodying my invention.

Fig. 2 is a view similar to Fig. 1 and illustrating the movable tire supporting arm retracted, Fig. 3 is a sectional view taken on line 3—3 of Fig. 1, Fig. 4 is a sectional view taken through the improved lock, and Fig. 5 is a sectional view further illustrating the lock construction.

In the preferred embodiment of the invention, a base 7 formed preferably of relatively narrow sheet metal is secured by means of an outturned foot 8 at one end thereof to project rearwardly and upwardly from the vehicle body. To the uppermost end of the base 7 tire supports in the form of arms 9 are connected. These arms are connected as by bolts 10 to the said base and project an equal distance radially therefrom. The ends of the arms 9 are equipped with crotch members 11 for the accommodation of the innermost edges of the tires to be supported thereby. The number of these crotch portions arranged upon the arms 9 will vary according to the number of tires it is required that the device support.

Extending radially from one edge of the base 7 and at an angle to the fixed arms 9 is a guide member 12. This guide member may be cast integrally with the base 7, or may be made of a separate piece of material and bolted to the said base, the said guide member having a journaled portion for slidably supporting an extensible tire support or arm 13. This support 13 is in all other respects similar to the arms 9, excepting that it is mounted within the guide 12 to slide inwardly and outwardly of the base. A lever 14 is pivoted as at 15 inwardly from one end to the base 7, being provided at its uppermost extremity with an elongated slot 16 through which a pin 17 secured upon the sliding arm 13 projects, it being understood that the lever end and arm 13 are arranged in overlapping relation.

By this arrangement it will be seen that rocking movement of the lever 14 will cause the arm 13 to be drawn inwardly or projected outwardly. When the arm 13 is at the limit of its outward movement, the crotch portion 11 carried thereby will be in such positions as to engage the adjacent portions of a tire supported by the fixed arms 9, the said sliding arm 13 creating a binding action upon the said tire, to firmly hold the same within the various supporting crotches. When the lever 14 is moved in an opposite direction, the arm 13 will be retracted and the tire or tires may be easily and quickly removed from the various supporting crotches.

With reference to Fig. 1 of the drawings, it will be seen that when the lever 14 has been moved to extend the arm 13, the free end of the said lever will lie in close proximity to and substantially parallel with the lowermost of the fixed arms 9. To enable the lever 14 to be locked securely in this position, a lock 18 is secured permanently upon the outer face of the said lowermost arm 9 and adjacent the free extremity of the lever 14. This lock is provided with a sliding latch 19, the latter being held normally in extended position by a compression spring 20 within the casing, and a lug 21 secured upon the lock bolt may be actuated upon the insertion of a key through the key hole 22 of the lock casing to retract the bolt. The free end of the lever 14 is bent laterally to provide a catch 23 to be engaged by the latch 19 of the lock. It will be seen that by rounding the outermost edge of the bolt 19, the lever end 23 may readily snap into engagement with the latch bolt, and to release the same it would be necessary to insert a key within the lock casing. Only a conventional form of lock is herein described, and it is apparent that locks of various descriptions or constructions may be applied to the arm 9 to efficiently secure the free end of the lever in such position as to hold the tire firmly upon the supporting device.

It is thus seen that an extremely simple and efficient means for supporting tires is provided, one wherein the tire is rigidly held against accidental or unauthorized detachment, and yet one wherein the tire may be readily detached from the holder when desired. It is also to be understood that various shaped or constructed crotch portion 11 may be provided at the free ends of the supporting arms to accommodate tires varying in construction.

While I have herein shown and described a particular or preferred embodiment of the invention, I desire it to be understood that I need not confine myself to all the precise details of construction herein set forth by way of illustration, as modification and variation may be made without departing from the spirit of the invention or exceeding the scope of the claims.

What is claimed is:—

1. In a tire holder, a base, arms radiating from said base, means at the extremities of said arms for supporting a tire, one of said arms being mounted to move radially from said base and the remainder being fixed, a lever pivoted on the base and having a slot and pin connection with the movable arm for moving said arm outwardly or inwardly, the said lever being adapted at its free end to lie in close proximity to one of said fixed arms when said movable arm is extended, and a lock on said adjacent arm for securing said lever, substantially as described.

2. In a tire holder, a base secured to the under portion of a vehicle body and projecting upwardly and rearwardly therefrom, arms radiating from the upper end of said base, a guide member carried by said base, and disposed at an angle to said arms, a slide arm in said guide, all of said arms being equipped at their outer ends with means for supporting tires, a lever pivoted to said base and overlapping the innermost end of said slide arm, a pin on said arm, the said lever being provided with a slot for the reception of said pin, a hook portion at the free end of said lever, and a lock on one of said fixed arms for the reception of said hook, substantially as described.

In testimony whereof, I affix my signature, in the presence of two witnesses.

KEITH A. BOWER.

Witnesses:
ALBERT L. SAUNDERS,
RALPH J. DOUGLASS.